United States Patent [19]

Aleff

[11] 4,201,317

[45] May 6, 1980

[54] FINGER ACTUATED PUMP ASSEMBLY

[76] Inventor: Hans P. Aleff, Old Sneech Pond Rd., Pole 188 - R.D. 2, Cumberland, R.I. 02864

[21] Appl. No.: 819,880

[22] Filed: Jul. 28, 1977

[51] Int. Cl.² .............................................. B67D 5/42
[52] U.S. Cl. ................................... 222/207; 137/855; 222/214; 222/380; 222/383; 222/477; 239/330; 417/479
[58] Field of Search ............... 222/207, 209, 210, 211, 222/212, 213, 214, 215, 321, 380, 383, 384, 385, 477; 239/330; 137/855, 856, 857, 858; 417/472, 479

[56] References Cited

U.S. PATENT DOCUMENTS

| | | | |
|---|---|---|---|
| 2,954,640 | 10/1960 | Catalano | 137/355 |
| 3,124,275 | 3/1964 | Lake | 222/207 |
| 3,255,933 | 6/1966 | Martin | 222/209 |
| 3,409,184 | 11/1968 | Stengle, Jr. | 222/321 |
| 3,507,586 | 4/1970 | Gronemyer | 137/355 |
| 3,726,442 | 4/1973 | Davidson et al. | 222/207 |
| 3,726,446 | 4/1973 | Hays | 137/355 |
| 3,749,290 | 7/1973 | Micallef | 222/207 |
| 3,973,700 | 8/1976 | Schmidt et al. | 222/207 X |
| 3,986,644 | 10/1976 | Grogan et al. | 222/207 |
| 3,995,774 | 12/1976 | Cooprider et al. | 222/207 |

*Primary Examiner*—Robert J. Spar
*Assistant Examiner*—Fred A. Silverberg
*Attorney, Agent, or Firm*—Robert J. Doherty

[57] ABSTRACT

A manually operable dispenser pump construction wherein liquid product is received from a supply container into an axially compressible bellows. The bellows in turn includes product discharge valve means associated therewith and adapted to move between open discharge and closed storage valve positions by movement of the bellows. In one form of the invention the product discharge valve valve includes a gooseneck portion integral with the bellows and which is moved out of closed position by said axial bellows compression. In another form the product discharge valve includes a generally circular gasket axially disposed between the bellows and its actuation means wherein said gasket is adapted to move into and out of sealing contact with a valve seat dependent on the compression of said bellows.

6 Claims, 23 Drawing Figures

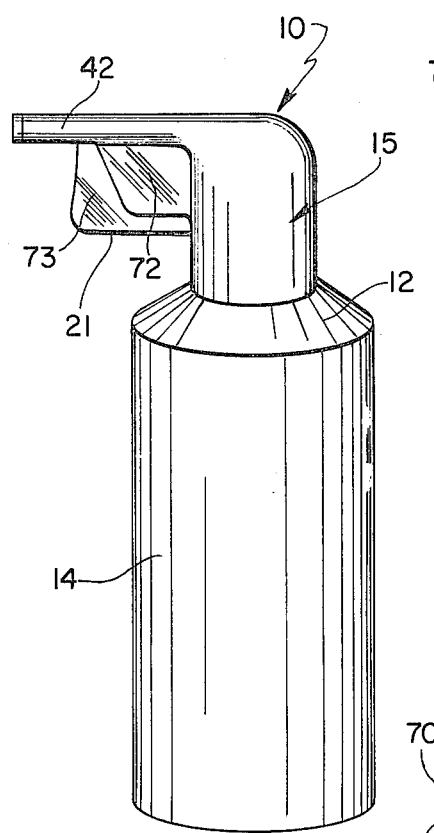
FIG. 1
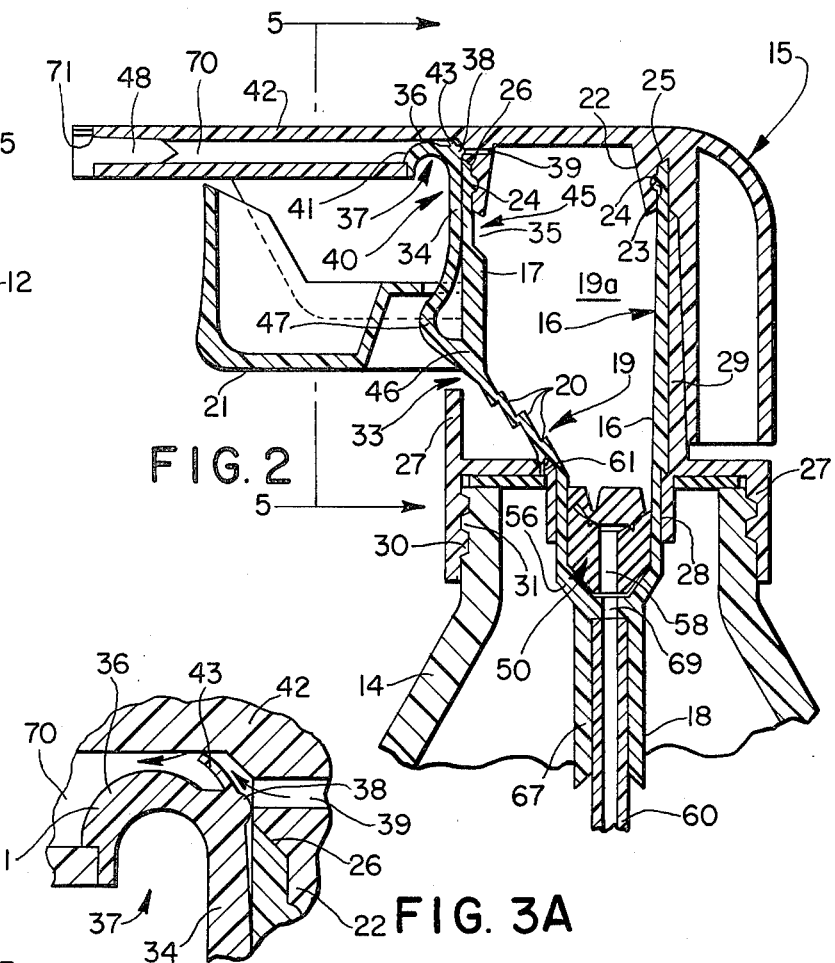
FIG. 2
FIG. 3A
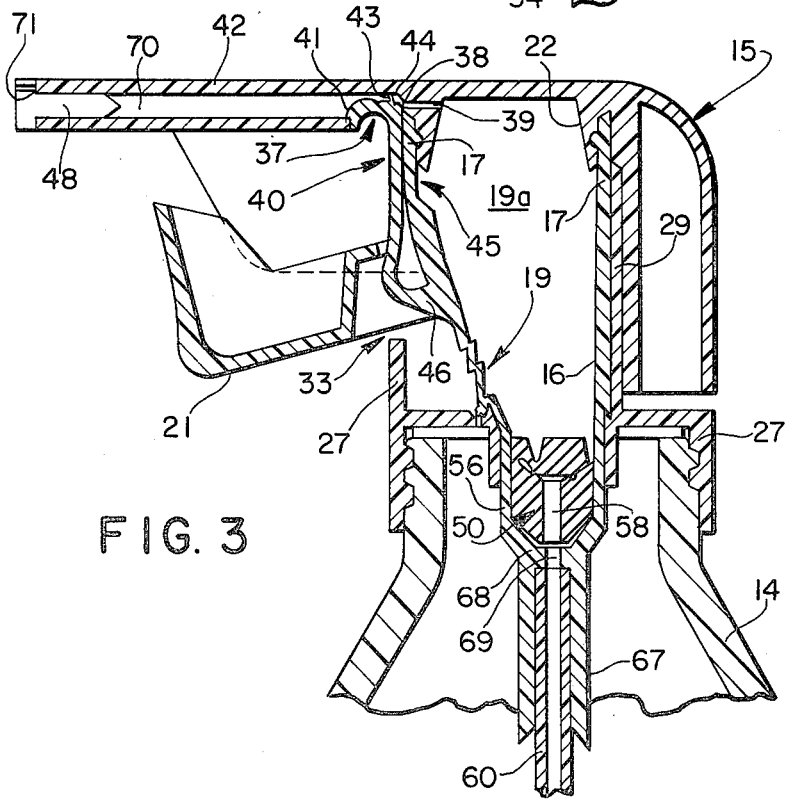
FIG. 3
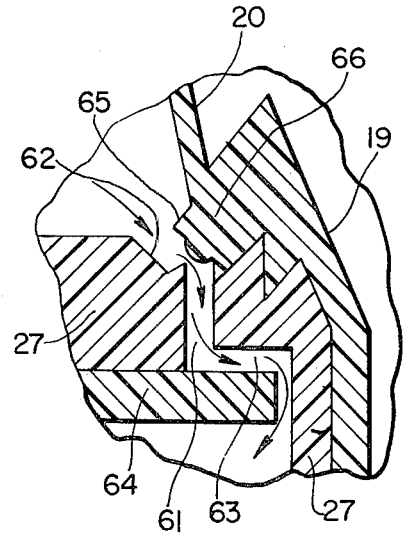
FIG. 4

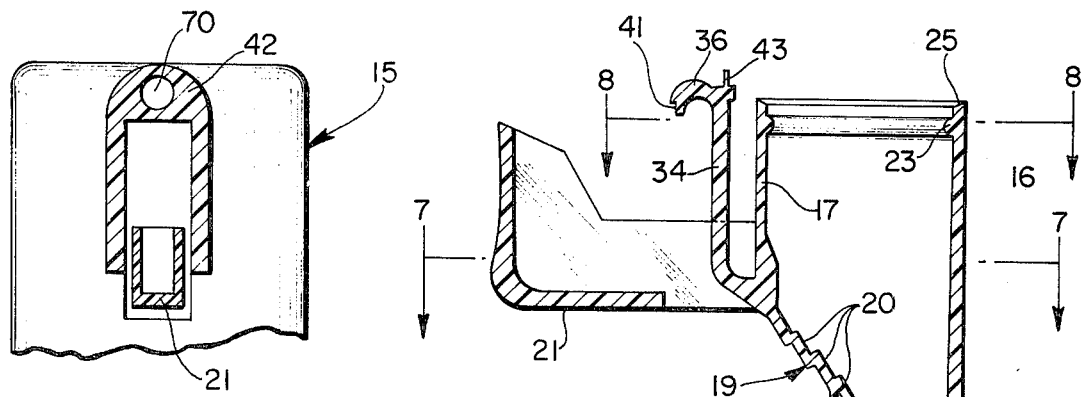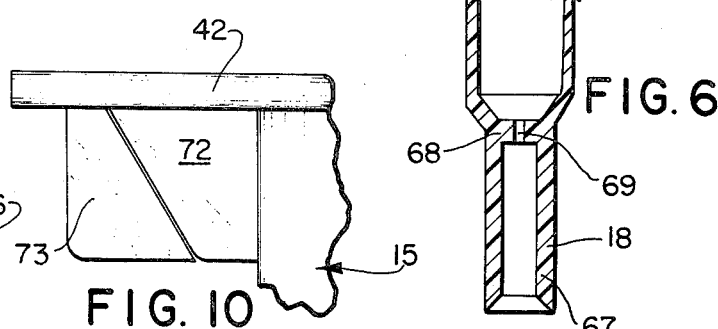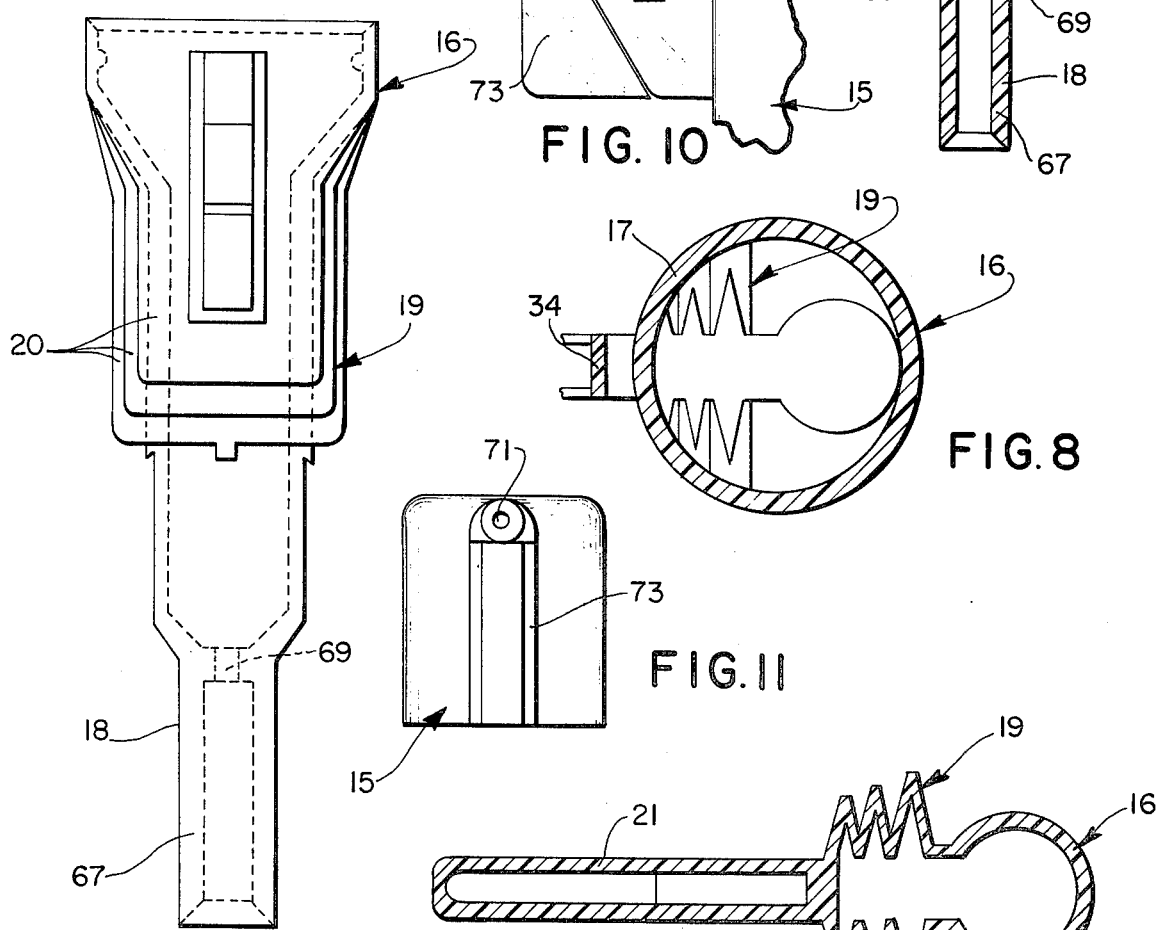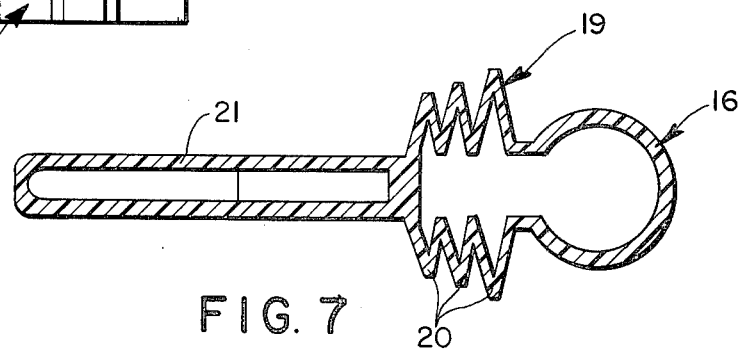

FINGER ACTUATED PUMP ASSEMBLY

BACKGROUND OF THE INVENTION

Manually operated dispensing pumps for liquid containers have been proposed in the past, and one having wide commerical application is disclosed in U.S. Pat. No. 3,749,290 issued to Micallef on July 31, 1973. This patent disclosed a variable volume pump chamber formed by a flexible tubular member, the volume of the chamber being varied by the trigger distorting the tube. Another dispensing pump is disclosed in U.S. Pat. No. 3,973,700 issued to Schmidt et al on Aug. 10, 1976. This patent shows the use of a resilient bellows as the variable volume pump chamber, with all the valving molded integrally with the bellows structure.

The use of a tubular member as shown by Micallef calls for a very flexible and resilient material such as rubber which may not be chemically resistant to many of the liquids intended to be dispensed. The use of a bellows overcomes this problem of freedom of material selection, however valving flaps in a bellows structure such as dicclosed by Schmidt et al provides for only minimal pressure to be exerted on the sealing surfaces of the flaps, thereby making it difficult to achieve a liquid tight seal.

In both pump types referred to above it is possible for vapors to be generated by the liquid in the container, i.e. under conditions of exposure to heat, such action can force liquid from the bottle into the pump chamber and through the discharge valve out into the open. This is in part due to the fact that the discharge valves are resilient and yield even to small pressures. For the same reason, both pump types referred to have the drawback that the spray pattern and liquid dispersion depends on the speed with which the trigger is pressed; a slow trigger movement resulting in a wet spray with large droplets or a stream, even when a fine, evenly dispersed spray pattern may be desired. Furthermore, these types of pumps are expensive, requiring parts of complex structure which are relatively costly to both manufacture and assemble.

Attempts to more evely regulate product flow by regulation of the amount of container available for collapse, i.e. reduced volume, have included the use of bellows for such purpose as indicated by U.S. Pat. No. 3,255,933 to Martin. U.S. Pat. No. 3,409,184 to Stengle, Jr. additionally utilized an axially collapsible bellows to receive product prior to dispensing such by its collapsing action.

Other prior art known to the applicant includes U.S. Pat. Nos. 3,061,202; 3,451,597; 3,486,663; 3,715,060; 3,726,442, 3,905,520, 3,986,644 and 3,955,774.

The above indicated patents are those which applicant is aware of and their citation herein and discussion where believed appropriate constitutes applicant's Prior Art Statement. A copy of each such patent is included with the application at the time of filing thereof.

SUMMARY OF THE INVENTION

This invention relates to a finger operated pump sprayer conveniently attachable to the mouth opening of a bottle and designed to dispense non-compressible liquids or semi-liquids such as lotions and the like from said bottle in various desired physical states such as in a fine mist spray or in a stream, which state is not dependent on the speed of finger motion used in the actuation of said pump.

More specifically, the present invention relates to a pump with a variable volume pump chamber in the shape of a bellows with a finger operated actuator which may include an integrally molded trigger, a one-piece molded intake checkvalve between the bottle and the pump chamber, and a discharge valve at the exit from the pump chamber to the surrounding atmosphere. The discharge valve will only open after the bellows has been partially collapsed and a predetermined minimum or threshold amount of pressure has been applied to the non-compressible liquid contained in the bellows. Until the discharge valve opens to free a passage for such liquid under pressure, the energy expended, i.e. finger pressure application by the user, is stored by expanding the walls of the pump chamber and compressing any air remaining in the pump chamber. This delay and energy stored ensures that the liquid will be forced out of the variable volume pump chamber with a predictable and constant minimum pressure and speed, thereby creating a predicatable and constant spray pattern and dispersion of the liquid for each specific discharge, configuration, size, etc. In most conventional pumps, this spray pattern and dispersion of the liquid depends mainly on finger actuation speed; a wet spray or a stream being a result of slow finger motion. It is also possible in most conventional pumps for vapors generated by the liquid in the container under conditions of exposure to heat to force liquid from the bottle into the pump chamber and through the discharge valve out into the open because the discharge valves are resilient and yield even to small pressures. This drawback is avoided in the present invention because the discharge valve will not yield to pressures from the inside of the pump chamber but has to be operated by positive movement of the actuator.

A further feature of the present invention is the provision of a pump sprayer having the foregoing characteristics and wherein leakage of liquid from the associated container is positively prevented until the finger operated actuator is pressed so that the container and attached pump sprayer may be stored and shipped in any position, i.e. an inverted position, without risk of leakage from the container. The pressing of the trigger or actuator thus not only collapses the bellows and forces the liquid out of the variable volume pump chamber, but also opens an air passage opening into the container to allow outside air to enter the container and replace the volume of the liquid dispensed. This air passage is sealed in the rest position in one embodiment by an extension post molded as an integral part of the bellows and in a second embodiment by a sealing gasket moving in concert with the bellows. An alternate version of the second embodiment includes the sealing gasket moving in concert with the bellows in addition to an extension post molded as an integral part of the bellows cooperating with a hole in the closure portion of the container. The movement of the collapsing bellows moves said extension posts and the sealing gasket away from the position in which they seal the air passage opening in the closure portion of the container.

A further feature of the present invention is to provide a pump sprayer having the foregoing characteristics and wherein the sealing surfaces need not be as soft and resilient as the rubbers and other elastomers presently used in many pumps and which are chemically not as resistant as certain harder thermoplastics so that a wider variety of liquids may be dispensed without undue regard to the chemical resistance of such sealing surfaces, i.e. toiletries, perfumes, deodorants, household detergents, and insecticides. Each pair of cooperating surfaces forming a seal between the contents of the container and the outside atmosphere is pressed together with a high pressure relative to the area of the sealing surface. In the first trigger actuated pump embodiment, the non-moving sealing surfaces at the interface of a screw cap and a body and at the interface of the body to an outer shell are pressed together by a press fit of a round tubular wall into a cylindrical hole, such cylindrical sealing surfaces being easy to manufacture with the precision required for a liquid-tight seal. The moving seal at the discharge valve is constructed in both embodiments in such a manner that the plastic memory of the material from which the body is made contributes to the forcing of a very small sealing surface against the opening to be sealed, so that the relative pressure measured in actual terms, i.e. pounds per square inch of sealing surface, becomes very high. The moving seal of the air passage opening may also be constructed according to the same principle in both embodiments.

A further feature of the invention is to provide a pump sprayer having the foregoing characteristics wherein each component may be easily and inexpensively molded. Generally, such components are molded by injection molding with molds of relatively simple construction; however, the bellows in the second embodiment constructed with a finger operated vertically orientated actuator is intended to be formed by blow-molding techniques. All components are also designed to be easily assembled with known high-speed automatic assembly equipment, using only press fits with accordingly no need for more expensive assembly techniques such as gluing or welding, except for the optional gluing of an optional screw cap linear into the screw cap, as is presently done on conventional screw-caps for bottles.

A further feature of the invention is to provide a pump sprayer having the foregoing characteristics and having a minimum number of components and including a body incorporating a bellows-structure, a screw cap, a lower checkvalve, an outer shell in one embodiment and an actuator in the other embodiment, a screw cap liner, a diptube, a dispensing nozzle, and in the embodiment with the finger operated vertically orientated actuator also a sealing gasket.

Other features, objects, and advantages of the invention shall become apparent as the description thereof proceeds when considered in connection with the accompanying illustrative drawings.

BRIEF DESCRIPTION OF THE DRAWINGS

Reference will now be made to the several embodiments of the invention illustrated in the drawings. In the accompanying drawings:

FIG. 1 is a perspective view of a container incorporating one constructional embodiment of the present invention therein;

FIG. 2 is a sectional view of FIG. 1 showing the trigger actuated type pump of the present invention in the rest position, fitted on the neck of a container for liquid to be dispensed;

FIG. 3 is a sectional view of the pump shown in FIGS. 1 and 2, but showing the actuation position of the trigger and wherein collapse of the bellows opens the air passage and opens the discharge valve;

FIG. 3A is a partial enlarged sectional view of a portion of the discharge valve in the open position;

FIG. 4 is an enlarged sectional view of the air passage shown in FIG. 3;

FIG. 5 is a front elevation sectional view of the pump shown in FIGS. 1-4 taken along line 5—5 of FIG. 2;

FIG. 6 is a sectional view of the body as molded, before assembly with the other components into the pump;

FIG. 7 is a plan sectional view of the body taken along the line 7—7 of FIG. 6;

FIG. 8 is a further plan sectional view of the body taken along the line 8—8 of FIG. 6;

FIG. 9 is a front elevational view of the body;

FIG. 10 is a partial side view of the outer shell showing a different construction of the trigger guard incorporating a removable plastic tab molded integral with the outer shell as a tamperproof seal;

FIG. 11 is a front elevational view of the outer shell shown in FIG. 10;

DETAILED DESCRIPTION OF THE INVENTION

Figure 12:
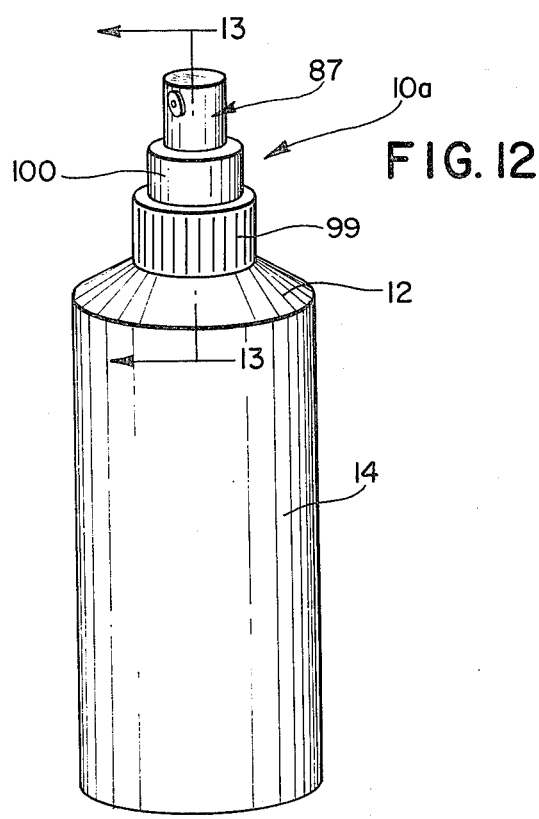
FIG. 12 is a perspective view of another or second embodiment of the invention showing the pump thereof in the rest position, fitted on the neck of the container for liquid to be dispensed.

Referring to FIGS. 1-11 of the drawings, a manually operated trigger actuated pump 10 is shown on the neck 12 of a container 14 containing the selected liquid to be dispensed. The pump includes an outer shell 15 and a body 16. This body 16 is constructed in such a way that it has a relatively rigid upper flange 17 and a relatively rigid lower part 18. The body also includes a bellows 19 formed by intermediate walls 20 connected to each other and to the rigid parts of the body integrally and hingedly at such angles that these angles can easily be changed by applying pressure against a trigger 21. The modification of such angles changes the volume enclosed by the bellows 19.

The outer shell 15 and the body 16 are press fitted together, the flange 17 of the body 16 fitting tightly over a tubular extension 22 on the inside of the outer shell 15, and an annular ring 23 on the inside of the flange 17 fitting into an annular groove 24 of the tubular extension 22. This fit of ring 23 into groove 24 holds the body 16 assembled into the outer shell 15 so that a chamfered top 25 of the flange 17 is pressed strongly against an annular sealing surface 26 inside the outer shell 15, thereby providing a liquid tight seal between the body 16 and the outer shell 15.

The lower part of the body 16 is press fitted into a screw cap 27, the area of engagement 28 of the two parts being cylindrical and smooth to assure a liquid tight seal between them. The upper part of the screw cap has an extension 29 shaped in a manner to provide support for the body 16 and the outer shell 15, and to prevent movement of these components relative to the screw cap 27. The screw cap 27 is formed with internal threads 30 which mate with the external threads 31 on the neck 12 of the container 14. Both the front of the screw cap 27 and the front of the outer shell 15 below an extension 42 thereof are slotted to form together an opening 33 to accommodate the trigger 21 which extends from the body 16 to the outside of the space enclosed by the outer shell 15 and the screw cap 27, the rest of the body 16 being on the inside of the space enclosed thereby.

During the assembly of body 16 into outer shell 15, a gooseneck 34 of the body 16 which is molded as an integral part thereof and parallel to a vertical front 35 of said body, is elastically bent so that the upper vertical part of the gooseneck 34 contacts the upper part of the vertical front 35 of the body 16, and a hook 36 of the gooseneck 34 snaps into an opening 37 in the bottom of the extension 42 of the outer shell 15.

The hook 36 has an overall span slightly larger than the opening 37 so that the hook 36 is bent and under tension, and, due to its plastic memory, presses a pad, i.e. a semi-spherical protrusion 38 on the hook 36 tightly into an exit or passage 39 molded through the tubular extension 22 of the outer shell 15, said protrusion 38 thereby sealing the exit slot 39 with strong pressure applied to the sealing surfaces. This cooperation between the exit slot 39 and the pad 38 on the hook 36 forms the construction of the discharge valve 40.

A step 41 on the hook 36 prevents the hook from sliding back out of the opening 37 in an extension 42 of the outer shell 15. The sides of the hook 36 fit tightly against the sides of the opening 37 so no liquid will leak therebetween during the spraying cycle of the pump 10.

A flat and thin shield 43 above the gooseneck 23 extends over the whole width of the pad 38 on the hook 36, and said shield 43 is elastically bent against the slanted wall 44 above the exit slot 39 in the outer shell 15. The pressure needed to bend this shield is very small so that no significant amount of the spring tension of the hook 36 is diverted from the sealing of the discharge valve 40 in order to bend the shield 43. However, the memory of the material from which the shield 43 is molded as an integral part of the body 16 assures that the shield 43 will always be in contact with the wall 44 unless air or liquid coming from internal portions of the bellows 19, i.e. a portion of a pump chamber 19a through the exit slot 39 forces the shield 43 to bend away from the inclined wall 44.

The length of the gooseneck 34 is such that it is slightly bent after the assembly of the body 16 into the outer shell 15. If pressure is exerted on the trigger 21, the lower end of the bellows 19 formed by the hingedly connected walls 20 of the body 16 collaspes, and the lower part of the vertical front 35 of the body rotates around an imaginary axis located in a thin material portion 45 of the front 35 of the body 16, said area 45 being thin and relatively flexible compared with the upper and lower ends of the front 35 of the body 16, and this area 45 thus forms a hinge connecting the upper and lower ends of the front 35 of the body 16. The gooseneck 34 is connected to the lower end of the front 35 of the body 16 by a rigid base 46 which projects from the lower part of the front 35 of the body 16. The area 47 where the rigid base 46 merges into the flexible part of the gooseneck 34 rotates also around such imaginary axis in the thin area 45 thereby increasing the distance between the merging area 47 and the exit slot 39.

A small increase of said distance will only straighten the bent gooseneck 34 without overcoming the resistance of the hook 36 against further elastic deformation thereof. However, a further increase of said distance by further pressure on the trigger 21 and further collapsing of the bellows 19 will pull down the upper part of the gooseneck 34 because its length can no longer be increased by straightening out to match said distance between merging area 47 and the exit slot 39. This downward movement of the upper part of the gooseneck 34 will move the pad or protrusion 38 on the hook 36 below the exit slot 39 against the spring tension of the hook.

This delay in opening the discharge valve 40 until the trigger 21 has traveled a certain minimal distance and the bellows 19 is accordingly partially collapsed assures that the liquid in the pump chamber 19a is under pressure before the dispensing action starts. This pressure distends slightly the walls 20 of the body 16 and the top of the outer shell 15 enclosing the pump chamber and compresses any air or other gas remaining therein and thus stores the energy applied by the finger pressing the trigger. Once the discharge valve 40 opens, this stored pressure immediately forces the liquid to a dispensing nozzle 48 communicating with the normally sealed exit slot 39. The liquid is thus directed at high speed through the various channels formed by cooperating surfaces between the dispensing nozzle 48 and the extension 42 of the outer shell 15 and enables good dispersion and fine spray patterns to be accomplished.

Figures 16, 17:
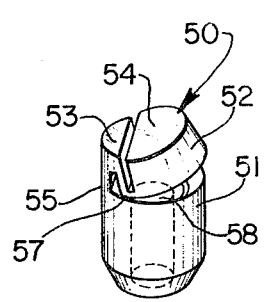
FIG. 16 is a perspective view of the lower checkvalve in the closed position.
FIG. 17 is a perspective view of the lower checkvalve in the open position.

Reference will now be made to FIGS. 2 and 3 in particular conjunction with FIGS. 16 and 17 wherein a checkvalve 50 formed of plastic material is assembled by friction fit into the lower part of the body 16. The checkvalve includes a tubular part 51 and a hingedly connected cover 52 having first and second parts 53 and 54 respectively. The cover is molded in one piece with an open first hinge 66 but closed for assembly into the lower part of the body 16. The sidewalls 56 of the lower part of the body 16 contact the first part 53 of the cover 52 which is nearest to the hinge 55 and thus prevents the checkvalve from returning to an open first hinge position. A second hinge 57 molded into the cover 52 and intermediate the first and second parts thereof allows the second part 54 to rotate around the hinge 57, thereby opening a passage 58 through the tubular part 51.

Figure 15:
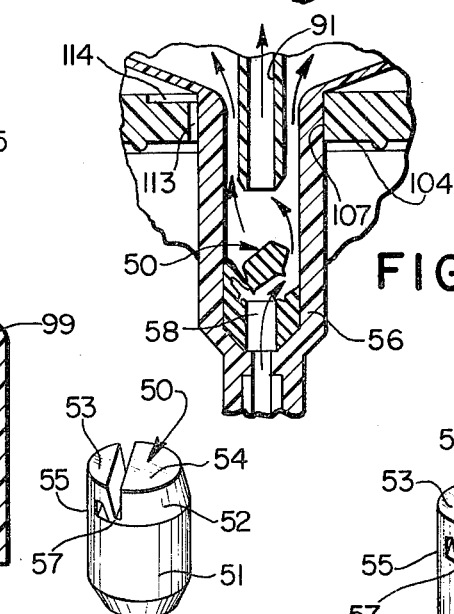
FIG. 15 shows the lower checkvalve in the open position during the return stroke of the actuator and bellows.

In the rest position, the memory of the hinge 57 molded into the cover 52 causes the second part 54 of the cover 52 to press against the upper surface of the tubular part 51 and closes the opening 58 therethrough. If pressure is generated above the checkvalve 50, for instance by actuating the trigger 21 and collapsing the bellows 19, such pressure will push the cover 52 still tighter against the upper surface of the tubular part 51 and create a still better seal for the duration of such pressure. If a vacuum is created above the checkvalve 50, for instance for expanding the bellows 19 and not immediately admitting air into the expanded volume created thereby, the pressure difference above and below the checkvalve 50 will cause the second part 54 of the cover to rotate upwards around the hinge 57 as shown in FIGS. 15 and 17 thereby opening passage 58 and enabling liquid to flow from the container 14 generally through a diptube 60 positioned in the lower part of the body 16, through the passage 58 and enter the interior of the pump chamber 19a. As best shown in FIG. 4, an air hole 61 having a lead-in funnel 62 extends through the screw cap 27. The lower part of the air hole terminates in a groove 63 on the inner surface of the screw cap 27 which allows airflow from the outside atmosphere through the air hole 61 into the container 41. In those cases where a cap liner 64 is utilized, such groove 63 extends therethrough as shown.

In the rest position of the pump, the air hole 61 is closed by a post 65 extending downward from a bottom ridge 66 of one of the walls 20 of the bellows 19, said post 65 being pressed firmly into the air hole 61 by the memory of such wall 20, but not of a force sufficient to dislodge the friction fit between the body 16 and the screw cap 27.

The post 65 and the lead-in funnel 62 have cooperating surfaces so that the post 65 is guided to the center of the air hole 61 and seals it when the bottom ridge 66 of the bellows 19 is appropriately positioned above the air hole 61. Substantial lateral movement of the bottom ridge 66 of the bellows 19 relative to the air hole 61 will tilt the post 65 in the funnel 62 and thereby free the air hole 61 for admission of air into the container 14 if the outside atmospheric pressure is greater than the air and vapor pressure inside the container 14.

The dip tube 60 is press fitted into an extension 67 at the lower end of the body 16 and serves to direct the liquid from the interior of the container 14 into the pump chamber 19a which includes that the volume enclosed by the assembly of body 16 including bellows 19, outer shell 15 and the checkvalve 50. The extension 67 terminates in a step 68 with a small orifice 69 leading to the passage 52 in the tubular part 51 of the checkvalve 50, such step 68 preventing the dip tube 60 from being positioned too far into the body 16 and thereby dislodgeing the checkvalve 50 from its seat in the lower part of the body 16.

The screw cap liner 64 is an optional component and can be replaced, depending on the surface of the container 14 to be sealed, by one or more annular sealing lips as will hereinafter be apparent in the explanation in connection with FIGS. 12–22. Such lips are integral with the inside bottom of the screw cap. The seal is obtained upon screwing the screw cap 27 completely on the neck 12 of the container 14, thereby compressing either the screw cap liner 64 or the annular sealing lips.

As previously indicated, the outer shell 15 is provided with a molded hollow extension 42. This extension includes an internal passage 70 connecting the exit slot 38 and the opening 37 closed by the hook 36 with the discharge orifice 71 of the extension 42 of the outer shell 15. The passage 70 includes a discharge orifice 71 which may be provided with any one of series of known configuration dispensing nozzles 48 for purposes of providing the desired spray pattern of the contained liquid to be dispensed.

Below the extension 42 of the outer shell 15, a trigger guard 72 is formed by two walls extending downwards and creating a slot between them which guides the trigger 21 laterally during its longitudinal travel.

The trigger guard 72 may include a removable wall section 73 molded integrally with the outer shell 15 and connected with the trigger guard 72 by very thin integral bridging portions or webs (not shown) which is accordingly easily removed by the consumer before use of the pump. This removable wall section 73 may be so shaped that the trigger 21 is fully enclosed and cannot be actuated until the removable wall section 73 is removed from the trigger guard. This feature assures the consumer a fresh package that has not been tampered with, and also prevents accidental actuation of the pump during shipment.

The body 16 and the checkvalve 50 may be made of any one of several available moldable materials with good resistance to flexural fatigue at the bellows ridges, good resistance to flexural creep under continuous load for maintaining the spring tension on several of the constructional components including tension of the gooseneck hook 36 and the checkvalve hinge 57 and good chemical resistance to the general types of liquids to be dispensed. Materials meeting these requirements are certain polyolefins and acetal resins, but many others may be suitable. The screw cap 27 and the outer shell 15 allow still wider freedom in the material selection including the wide range of materials that meet the chemical resistance requirements. They can also be molded of any one of many available materials, such as most polyolefins, and the choice of material would be mainly governed by economic consideration.

Operation of the pump 10 is as follows: with reference to FIG. 2, the checkvalve 50, the discharge valve 40 and the airhole 61 are closed. When it is desired to actuate the pump, the trigger 21 is manually pressed causing the bellows 19 to at least partially collapse. The air inside the pump chamber 19a is compressed and escapes through the discharge valve 40, past the thin shield 43 which is bent away from the proximal portion 44 of passage 70 by the pressure of the escaping air as soon as the discharge valve 40 opens. Opening of the discharge valve 40 is delayed until the movement of the trigger 21 and collapsing bellows 19 has sufficiently straightened out the bent gooseneck 34 and then moved the pad 38 on the hook 36.

This delay in opening the discharge valve 40 until the trigger 21 has traveled a certain distance and the bellows 19 is partially collapsed assures that the liquid in the pump chamber 19a is under pressure before the dispensing starts. This pressure distends slightly the walls 20 of the body 16 and of the outer shell 15 and compresses any air or other gas remaining in the pump chamber 19a and thereby stores the energy applied by the finger pressing the trigger. Once the discharge valve 40 opens, this stored pressure forces the liquid through the passage 70 to the dispensing nozzle 48 thus enabling a good dispersion and fine spray pattern of the liquid to be dispensed.

The pressing of the trigger also opens the airhole 61 but no air movement through it is likely to occur at the initial trigger pressing because pressure equilibrium between the surrounding atmosphere and the inside of the container 14 is likely to exist. The checkvalve 50 is closed still tighter than normal due to the increased air pressure in the pump chamber 19a above it.

The dispostion of various components with the trigger pressed inwards is shown in FIG. 3. Upon releasing the trigger 21, the thin shield 43 snaps back against the wall 44 to prevent a rush of air from the outside into the pump chamber 19a through the exit slot 39 before said exit slot 39 is closed by the pad 38. The pad by reason of its vertical movement with respect to the exit slot 39 is capable of completely blocking such off or permitting flow of either liquid or air therethrough. The downward force on the gooseneck by reason of the bellows collapse produces this vertical movement and thus enables the pad to slide with respect to the exit slot 39 to open and close such for liquid flow, inward air flow being prevented by the normally closed position of the shield 43.

The bellows 65 thereafter expands due to the memory of the hinges connecting its walls 20, thus creating a partial vacuum inside the pump chamber 19a. The pressure inside the container 14 is now greater than in the pump chamber 19a. This pressure is sufficient to open the checkvalve 50 by rotation of the second cover part 54 about the second hinge 57 and draws liquid from the container 14 through the dip tube 67, through the passage 58 and into the pump chamber 19a. During the initial part of this return movement of the trigger 21 and bellows 19, the airhole 61 is still open, and the volume of the liquid that is drawn up into the pump chamber 19a is replaced by air until the post 65 closes the air hole 61. If this closing of the airhole 61 occurs before the full amount of liquid is drawn up into the pump chamber 19a, a very slight vacuum will exist in the headspace of the container 14, but such generally is insignificant when compared with the partial vacuum inside the pump chamber 19a.

After one or more such movements of the trigger 21, the pump chamber 19a will be mostly filled with liquid, and each repetition of the cycle of pressing and releasing the trigger will dispense liquid through the discharge valve 40 and the nozzle 48 and further allow air to enter the container 14 to replace the said liquid.

In the alternative constructional embodiment disclosed in FIGS. 12–22, a finger actuated pump 10a is shown on the neck 12 of a container 14 containing the selected liquid to be dispensed. The pump 10a includes a body 80 with rigid upper and lower apertures defined by rims 81 and 82 and having between these apertures a plurality of conical walls 83 interconnected with each other, and forming a bellows 84. The walls of the bellows are integrally and hingedly interconnected in a fluid-tight manner and disposed at angles which can easily be decreased by applying pressure along the longitudinal axis thereof so as to at least partially collapse the bellows 84. The lower aperture 82 of the body 80 is closed by the checkvalve 50 assembled by friction fit into the lower part thereof and operative in the same manner as with pump device 10.

The upper aperture of the body 80 is closed by a discharge valve assembly 85 including an annular sealing gasket 86 and an actuator 87, said actuator having a central stem 88 extending through the central opening 89 in the sealing gasket. The stem 88 includes a body portion 90 and an extension 91 projecting longitudinally into the bellows 84. The stem extension may be hollow as shown or solid and serves in part as a guide to assure axial collapse of the bellows 84. Such body portion 90 and the extension 91 merge in a downwardly inwardly tapered conical section 92, such conical section having an upper shoulder 93 at its upper end and extending around the entire upper periphery thereof. The lower end of the conical section 92 includes a lower shoulder 94 also extending around the entire lower periphery of the conical section 92. The body portion 90 includes a longitudinally extending channel 95 which terminates at the conical section in an orifice 96. The channel 95 extends upward into the body portion 90 and leads into one end of a discharge passage 97. The other end of said discharge passage being open to the atmosphere and provided with any one of a series of known dispensing nozzles 48 having configurations of channels for purposes of providing the desired spray pattern of the contained liquid to be dispensed.

The sealing gasket 86 is fitted over the central stem 88 with its inner wall which forms the central hole 89 thereof pressed against the conical section 92 in such a manner that such inner gasket wall is distended from its originally cylindrical shape and at least partially conforms to the wall configuration of the conical section 92. This deformation of the sealing gasket 86 changes its shape from that of a disc to one having a somewhat conical configuration. The sealing gasket cannot be pressed beyond the conical section 92 because the outer diameter of the shoulder 93 is substantially larger than the extended internal diameter of the central hole 89.

The inside wall of the central hole 89 thus presses against the conical section 92. It is also adapted to more tightly engage the edge of the lower shoulder 94 so as to form a liquid tight seal between said surfaces.

The outer periphery of the sealing gasket 86 is adapted to move upward relative to the conical section 92 of the stem 88 either by upward pressure applied against said periphery, or by downward pressure applied to the central area of the sealing gasket 86 immediately surrounding the central hole 89 thereof while simultaneously preventing the periphery of the gasket from moving downward. Such movement of the outer periphery of the sealing gasket relative to the conical section will elastically deform the sealing gasket 86 so as to increase the angle of the cone defined by the side walls of the central hole 89 of the sealing gasket 86. The largest diameter of said central hole remains unchanged, being defined by the non-compressible upper diameter of the conical section 92 just below shoulder 93, but the smaller diameter of said central hole increases with such further deformation and causes the seal formed by the engagement of the wall of the central hole against the edge of the shoulder 94 to be opened as soon as said smaller diameter of the central hole becomes larger than the diameter of the edge of the shoulder 94. The above referred to repeated compression and release of the gasket enables the discharge valve assembly 85 to function as a valved outlet for liquid within the bellows 84.

The gasket 86 is prevented from slipping off the conical section 92 and onto the stem extension 91 by reason of the upper rim 81 of the body 80 pressing against the area surrounding the central hole 89 thereof. Such pressure causes a liquid-tight seal between the rim 81 and the sealing gasket 86. The pressure for this sealing action is supplied by the plastic memory of the bellow 84. The bellows is in turn enclosed in a space 98 below the gasket 86 and the actuator 87 and between the walls of a screw cap 99 and a cap extension 100. Such cooperative assembly is prevented from upward movement by the inner surface of the top 101 of the extension 100 retaining an annular rim 102 at the base of the outer wall of the actuator, said rim 102 being too large to pass through an upper aperture 103 in the cap extension 100. The cap 99 is adapted to receive a liner 104, said liner having a tubular extension 105 pressfitted into the cylindrical cap extension 100. The liner further includes an inwardly directed portion 106 terminating in an opening 107 into which the lower rim 82 of the bellows is adapted to fit. The portion 106 contacts the rim 82 in such a manner to axially precompress bellows 84. The space 98 accordingly has an internal height less than the original height of the bellows 84 prior to its assembly into the cap extension. The bellows is thus compressed to a degree sufficient for the generation of aforesaid pressure for the sealing action between said upper body aperture formed by the rim 81 and the sealing gasket 86 and for additionally maintaining the sealing gasket in its deformed conical shape pressed against the conical section 92. Such pre-composition of the gasket also provides the sealing action between the outer periphery of the gasket and a circular sealing lip 108 downwardly extending from inside the top wall 109 of the cap extension 100.

In the rest position of the pump 10a, the periphery of the cone-shaped deformed sealing gasket is separated from the outer wall of the actuator 87 by a space 111, such space allowing a predetermined freedom of movement for said periphery for further deformation as described above.

Figure 14:
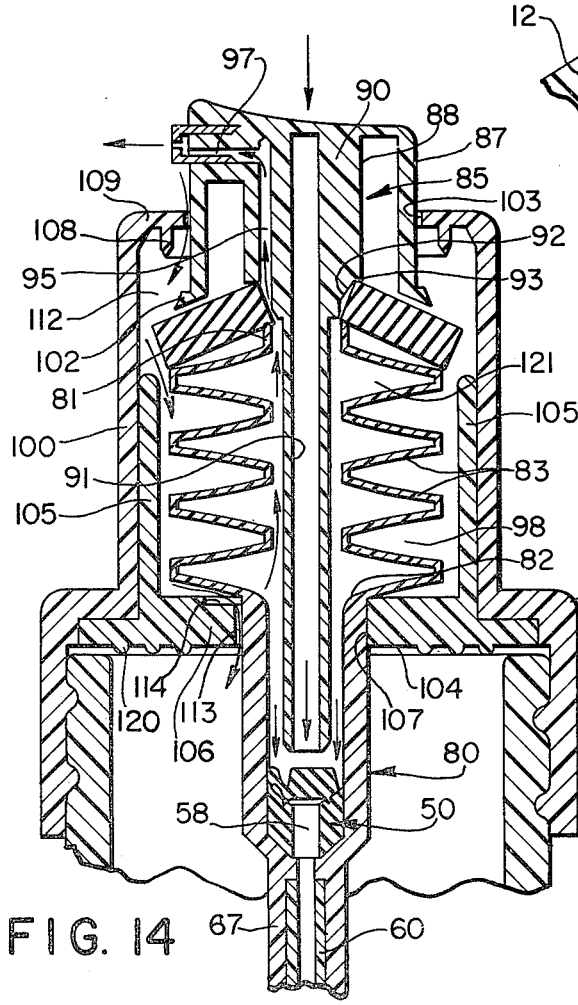
FIG. 14 is a sectional view of the pump similar to FIG. 13 but showing the position in which the actuator has been depressed, the bellows collapsed, the discharge valve opened and the air passage opened.

The periphery of the sealing gasket is pressed in the rest position of the pump 10a upwardly against the circular sealing lip 108 inside the top wall 109 of the cap extension 100. Such cooperation between the periphery of the sealing gasket and the circular sealing lip 108 forms a liquid tight seal for an air passage 112 formed as best shown by FIG. 14 between the actuator and the cap extension. The pressure for said sealing action is also supplied by the memory of the bellows pressing continually urging the sealing gasket upwards.

When the assembly including the sealing gasket and the actuator is moved downward relative to the screw cap, the seal for the air passage 112 opens for admission of air into the space 98 and from there into the container 14 through an open vertically orientated airhole 113 in the plugliner portion 106. In order not to interfere with the bottom of the conical wall 83 of the bellows 84, such air hole 113 may include a lateral portion 114. The airhole in the plugliner may, in an alternate construction shown in FIG. 20, be sealed in the rest position of the pump by a post 115 extending downward from the lowermost wall of the bellows 84 through an airhole passage 116, the post 115 fitting tightly into the passage 116 in the closed sealing position shown.

When the bellows is collapsed, the post 115 is pushed downward, and a longitudinally orientated groove 117 in the post 115 slides from its rest position above the airhole passage 116 into the passage 116 with its lower end extending through the plugliner into the container 14 while the upper end of said groove 117 is still in the space 98 above the plugliner so as to connect the airspaces above and below the plugliner. It should be clear that the groove 117 is longer than the width of the liner 104 so as to span air passage 116 therethrough.

To avoid the need for rotational orientation of the body 80 against the liner 104 during assembly to line up the post 115 with the airhole 116, the liner has a non-circular extension 118 extending downward into the container 14 and the lower end of body 80 is provided with a similarly shaped non-circular extension 119. The internal side wall of said extension 118 thus guides and orients the non-circular outer wall 119 of the lower end of the body 80 into the one and only position where the post 115 is properly aligned with the air passage 116.

The diameters and heights of the individual sections of the bellows 84 do not have to be identical. It may be desirable, however, for ease of manufacturing to keep the wall thickness of all bellows sections constant. It is also possible to influence the sequence in which the individual sections of the bellows collapse by varying the outer diameters of such individual sections, i.e., sections with larger outer diameters collapsing before sections with smaller outer diameters. It is also possible to vary the heights of such individual sections, sections with lesser height collapsing before sections with greater height but of essentially equal outer diameter. Such sequential collapsing of the individual sections of the bellows can be used to influence the order in which the various functions of the bellows are performed, such as moving the post 115 through the airhole 116, or pushing the upper section of the bellows against the lower surface of the gasket 86 to further deform said sealing gasket and open up its central hole (increase its cone angle).

The lower flat surface of the plugliner 104 may have one or more annular sealing lips 120 integral therewith so that a seal is obtained upon screwing the screw cap 99 completely on the neck 12 of the container 14, thereby pressing the liner 104 against the upper surface of the neck 12 and compressing the annular sealing lips 120.

The dip tube 60 is pressfitted into an extension 67 at the lower end of the body 80 and serves to direct the liquid from the interior of the container 14 into the pump chamber 121 defined as the volume enclosed by the body bellows 84, the lower checkvalve 50 and the discharge valve assembly comprising the sealing gasket 86 and the actuator 87.

The body 80 may be injection-blowmolded or extrusion-blowmolded of any one of several available moldable materials with good resistance to flexural fatigue at the bellows ridges, good resistance to flexural creep under continuous load for maintaining the spring-tension of the bellows compressed into the space 98, and good chemical resistance to the general types of liquids to be dispensed. Among the materials meeting these requirements are certain polyolefins and acetal resins, but many others may be suitable.

The sealing gasket 86 may be molded or stamped out of any one of many available materials with good resistance to flexural creep under continuous load for maintaining its memory of its original shape, sufficient softness for effective sealing against the harder surfaces of the actuator and the screw cap, and good chemical resistance to the general types of liquids to be dispensed. Among the materials meeting these requirements are certain polyolefins and some of the harder polyurethane elastomers, but many others may be suitable.

The screw cap 99, the liner 104, and the actuator 87 allows still wider freedom in the material selection among the wide range of materials that meet the chemical resistance requirements. They can be molded of any of many available materials such as most polyolefins, and the choice of material would be mainly governed by economic considerations.

Figure 13:
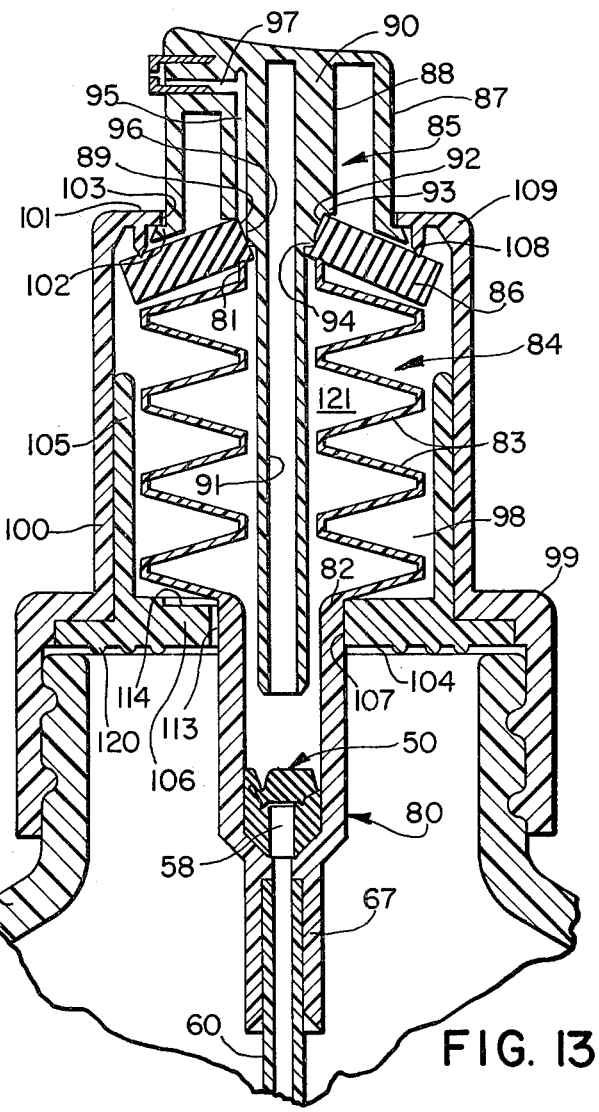
FIG. 13 is a sectional view taken along the line 13—13 of FIG. 12.
Figure 18:
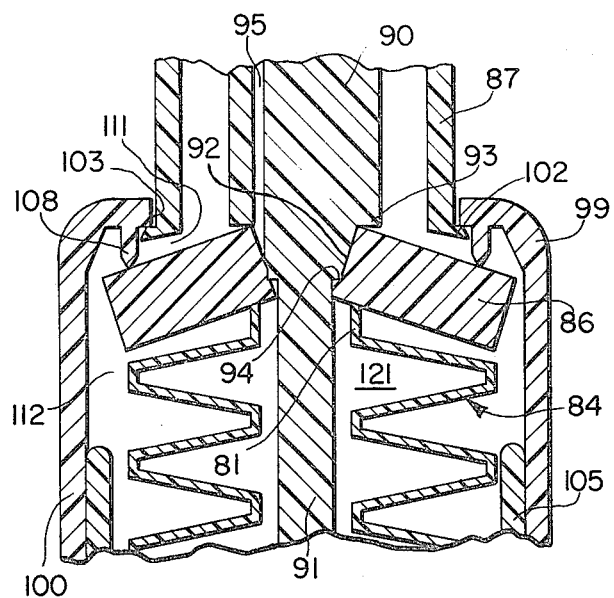
FIG. 18 is an enlarged sectional view of a portion of FIG. 13.
Figure 19:
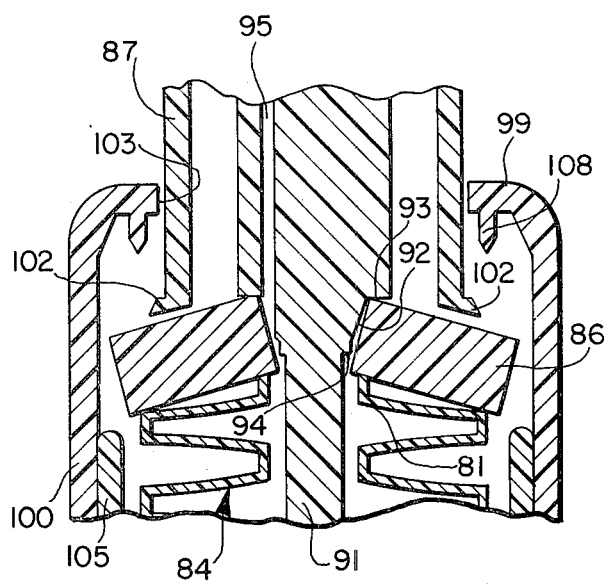
FIG. 19 is an enlarged sectional view of a portion of FIG. 14.

With the disposition of parts shown in FIG. 13, the checkvalve 50, the discharge valve 85, and the seal for the air passage 112 are closed. When it is desired to prime the pump 10a, the actuator 87 is pressed downwards by the finger, the bellows 84 collapses and the air inside the pump chamber 121 is compressed and escapes through the discharge valve 85 as soon as such discharge valve opens. The discharge valve 85 is opened by urging the outer periphery of the gasket with respect to its center relatively upwards so as to increase the angle of its conical central opening 89 and thus assure that the inner walls defining such opening move away from sealing contact with the conical surface 92. This action is accomplished as best shown in FIGS. 18 and 19 wherein the upper shoulder 93 of the actuator 87 and upper rim 81 of body 80 serve to in effect capture interior central portions of the gasket between them. When the actuator 87 is depressed, it forces the central portion of the gasket down, thus also initiating collapse of the bellows. Inasmuch as it is the central bellows portions which are normally squeezed together, the bellows becomes initially centrally shortened permitting the central portions of the gasket to move downwardly not only in an overall sense but also with respect to the outer periphery thereof.

Figure 21:
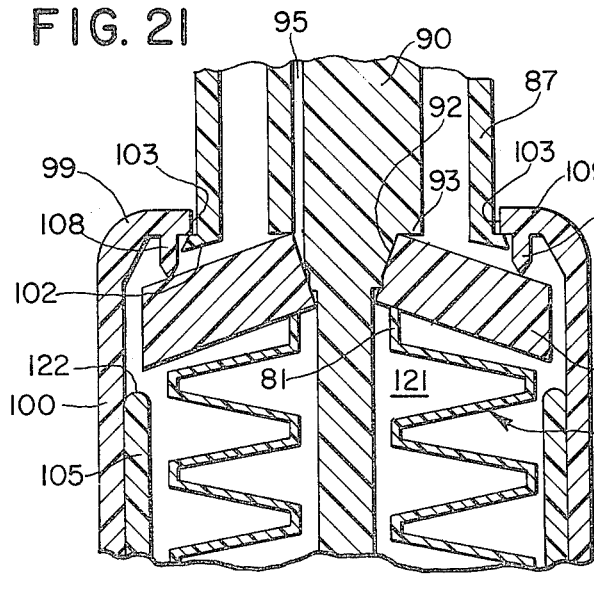
FIG. 21 is a partial sectional view of an alternate form of that embodiment of the invention shown in FIGS. 12-20 and shows a different manner in which the discharge valve is actuated.

It is also possible to stop the downward movement of the periphery of the sealing gasket by a cooperating surface of the liner extension 105. According the upper rim 122 of the tubular extension may be dimensioned so as to form an obstruction in the downward path of the outer periphery of the gasket. Such alternative construction is shown in FIGS. 21 and 22.

In any event, the opening of the discharge valve 85 is delayed until either the center of the top section 81 of the bellows 84 has collapsed relative to the outer periphery thereof or the outer periphery of the sealing gasket 86 has encountered the top rim 122 of the tubular extension 105 dependent on which construction is utilized.

This delay in opening the discharge valve 85 until the actuator 87 has traveled a certain distance assures that the liquid in the pump chamber 121 is under pressure before the dispensing starts. This pressure distends slightly the walls of the bellows and compresses any air or other gas remaining in the pump chamber, thereby storing the energy applied by the finger pressing the actuator 87. Once the discharge valve 85 opens, this stored energy forces the liquid to the dispensing nozzle 48 and causes a good dispersion and fine spray pattern as the liquid exits the pump 10a. In such attitude, the checkvalve 50 is closed still tighter than normal due to the increased pressure in the pump chamber 121 above it. The air passage 112 is open and in the alternate construction shown in FIG. 20, both the air passage 112 and the air passage 116 are open, but no air movement through it is likely to occur upon initial actuation because pressure equilibrium between the surrounding atmosphere and the inside of the container 14 is likely to exist.

Figure 20:
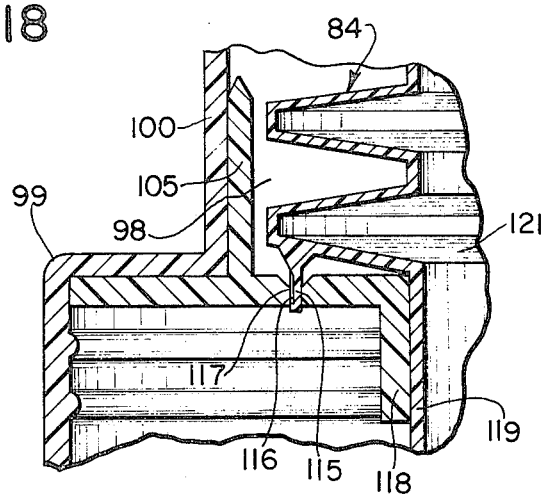
FIG. 20 shows an alternate construction of the embodiment shown in FIGS. 12-19 wherein the actuator-operated pump includes an extension molded integral with the bellows sealing an airhole in the plugliner.
Figure 22:
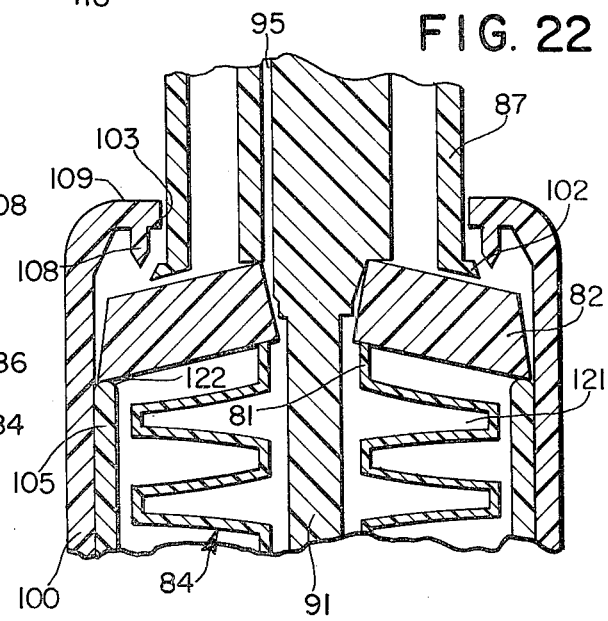
FIG. 22 is a partial sectional view similar to FIG. 21 showing the discharge valve in an open position, it having been shown in the closed position in FIG. 21.

The disposition of the parts with the actuator pressed downwards is shown in FIGS. 19, 20, and 22 dependent on the alternate constructional embodiments Upon releasing of the actuator, the bellows expands due to its memory and the center of the sealing gasket is pushed upwards relative to its outer periphery. This action reseals the discharge valve 85 and prevents a substantial amount of air from entering the pump chamber 121 through the discharge passage 97, the channel 95 and the orifice 96. The expanison of the bellows 84 creates a partial vacuum inside the pump chamber 121. The pressure inside the container 14 is now greater than in the pump chamber 121. This pressure difference opens the checkwise 50 so as to draw liquid from the container 14 through the diptube 60 and through the passage 58 in the checkvalve and then into the pump chamber 121. During this return movement of the actuator and the bellows, the air passage 112 is still open, and the volume of the liquid that is drawn up into the pump chamber is thus replaced until the gasket presses against the circular sealing lip 108 and thereby seals the air passage 112.

After one or more such movements of the actuator and the bellows, the pump chamber will be mostly filled with liquid, and each repetition of the cycle of pressing and releasing the actuator will dispense liquid through the discharge valve and to the nozzle 48 and allow air to enter the container 14 to replace such liquid.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A manually operable pump for dispensing non-compressible liquid product comprising, a body, said body including container sealing means for forming a liquid tight engagement with a product container at one portion thereof and a product discharge means including a discharge opening at another portion thereof, an axially collapsible bellows having a plurality of integral wall segments, said bellows positioned in said body and forming a chamber for receipt of product from said container and subsequent dispensing thereof outwardly of said body, actuation means operatively associated with said bellows for at least partially axially collapsing said bellows, product discharge valve means supported by said bellows at one end thereof and communicating with said body discharge opening to norally seal such wherein collapsing movement of said bellows sequentially alters the position of said discharge valve means from said normally closed position to an open position and forces product within said chamber outwardly of said discharge opening, and valve means positioned at the other end of said bellows for directing product into said chamber upon expansion of said bellows wherein said product moves axially through said chamber from one end to the other, said bellows disposed in a generally horizontal axial disposition and having an outer face defining said one end thereof, said actuation means including a trigger forwardly extending from said outer face at a lower end thereof distal from said discharge valve means, said body cooperating with said bellows outer face whereby rearward movement of said trigger simultaneously arcuately pivots said lower end with respect to said upper end and at least partially collapses said bellows, said discharge valve means including an actuation arm extending along said bellows outer face and forwardly connected thereto at said lower end thereof, said body and said bellows outer face fixed in a position wherein rearward trigger movement moves said arm downwardly so as to displace said discharge valve means away from said body discharge opening.

2. The pump construction of claim 1, said discharge valve means actuation arm slidably positioned with said body at that end thereof opposite to its connection with said bellows face, said arm including a valve member outwardly extending therefrom and normally engaged with a valve seat in said body discharge opening, said valve member movable away from said seat upon downward extension of said arm upon said rearward trigger movement.

3. The pump construction of claim 2, said actuation arm being in the shape of a gooseneck having a flexible intermediate portion whereupon arcuate movement of its lower end upon said rearward trigger movement initially extends said flexible portion for a part of said trigger travel prior to opening of said discharge valve.

4. A manually operable pump for dispensing non-compressible liquid product comprising, a body, said body including container sealing means for forming a liquid tight engagement with a product container at one portion thereof and a product discharge means including a discharge opening at another portion thereof, an axially collapsible bellows having a plurality of integral wall segments, said bellows positioned in said body and forming a chamber for receipt of product from said container and subsequent dispensing thereof outwardly of said body, actuation means operatively associated with said bellows for at least partially axially collapsing said bellows, product discharge valve means supported by said bellows at one end thereof and communicating with said body discharge opening to normally seal such wherein collapsing movement of said bellows sequentially alters the position of said discharge valve means from said normally closed position to an open position and forces product within said chamber outwardly of said discharge opening, and valve means positioned at the other end of said bellows for directing product into said chamber upon expansion of said bellows wherein said product moves axially through said chamber from one end to the other, said bellows adapted to at least partially collapse so as to build up pressure within said chamber prior to opening said discharge valve means, said discharge valve means including a somewhat flexible actuation arm having a curved material section forming slack therein, said arm adapted for arcuate movement upon movement of said actuation means wherein said slack is removed during the initial collapsing of said bellows whereby pressure is built up therein prior to opening of said discharge valve means.

5. The pump construction of claim 4, said actuation arm of gooseneck shape, the base thereof integrally attached to said bellows and the head thereof slidably positioned with respect to said body, a discharge valve member outwardly extending from an intermediate portion thereof and adapted to move from a normally closed position in engagement with said body discharge opening to an open position after arcuate extension of said base portion thereof.

6. The pump construction of claim 5, said discharge valve member being a generally rounded plug having a generally vertically orientated curve surface adapted to slide along the body surface proximal said discharge opening therein so as to uncover said discharge opening.

* * * * *